(12) United States Patent  (10) Patent No.: US 7,934,759 B2
Weller                    (45) Date of Patent:     May 3, 2011

(54) PACKAGING SYSTEM INCLUDING PALLET DE-LAYERING SYSTEM

(75) Inventor: Samuel D. Weller, Alexandria, MN (US)

(73) Assignee: Brenton LLC, Alexandria, MN (US)

( * ) Notice: Subject to any disclaimer, the term of this patent is extended or adjusted under 35 U.S.C. 154(b) by 942 days.

(21) Appl. No.: 11/738,237

(22) Filed: Apr. 20, 2007

(65) Prior Publication Data

US 2008/0260512 A1  Oct. 23, 2008

(51) Int. Cl.
*B66F 9/18* (2006.01)

(52) U.S. Cl. ............ 294/119.1; 294/87.1; 294/907; 414/796.2; 414/796.9

(58) Field of Classification Search ............ 294/63.1, 294/63.2, 86.4, 87.1, 119.1, 907; 414/792.9, 414/796.2, 796.9, 799; 53/531, 244, 247, 53/250
See application file for complete search history.

(56) References Cited

U.S. PATENT DOCUMENTS

| | | | | |
|---|---|---|---|---|
| 2,924,484 A * | 2/1960 | Tolsma | ............... | 294/87.1 |
| 3,030,138 A * | 4/1962 | Bennett | ............... | 294/63.1 |
| 3,507,404 A * | 4/1970 | Pompe | ............... | 414/796.2 |
| 3,825,293 A * | 7/1974 | Schwarz | ............... | 294/63.1 |
| 4,119,217 A * | 10/1978 | Jones | ............... | 414/788.6 |
| 5,082,319 A * | 1/1992 | Hurliman et al. | ............... | 294/119.1 |
| 5,141,274 A * | 8/1992 | Hayden et al. | ............... | 294/2 |
| 5,253,974 A * | 10/1993 | Williams | ............... | 414/623 |
| 5,411,362 A * | 5/1995 | Neri et al. | ............... | 414/796.9 |
| 6,003,917 A * | 12/1999 | Tygard | ............... | 294/87.1 |

* cited by examiner

*Primary Examiner* — Dean J Kramer
(74) *Attorney, Agent, or Firm* — Thompson Hine LLP

(57) ABSTRACT

A packaging system for handling palletized product arranged in multiple layers of product cases, a pallet de-layering system includes a gripper mechanism. The gripper mechanism is configured to clamp a layer of the multiple layers by applying a clamping force to one or more product cases of the layer such that the layer can be removed from an adjacent layer of product cases to a different location. The layer includes a void between adjacent product cases. The gripper mechanism includes a void filling member carried by the gripper mechanism. The void filling member is sized and located to be positioned within the void to limit movement of the adjacent product cases into the void during a clamping operation.

8 Claims, 14 Drawing Sheets

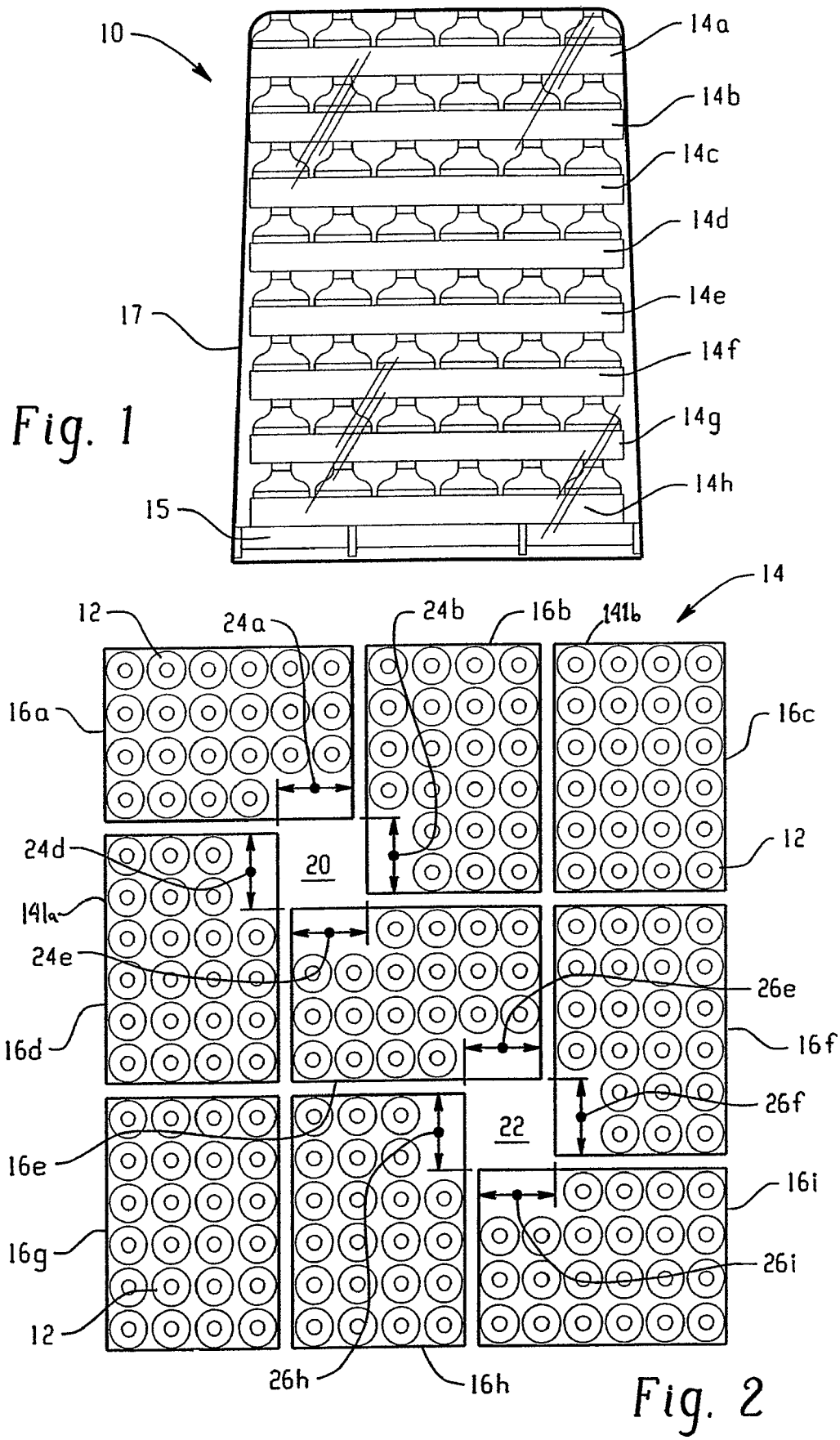

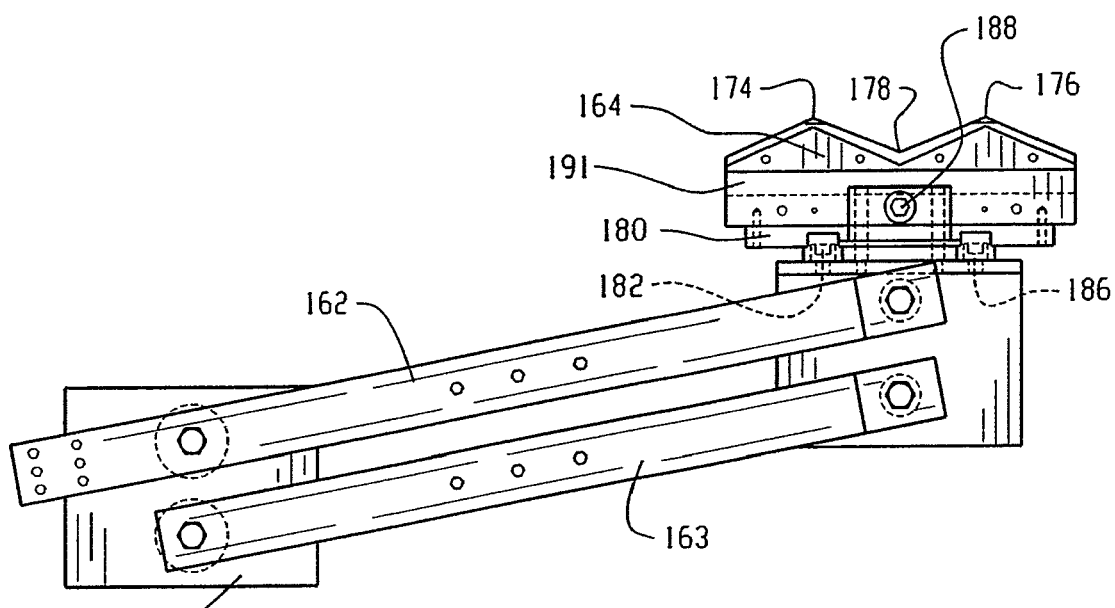
Fig. 16
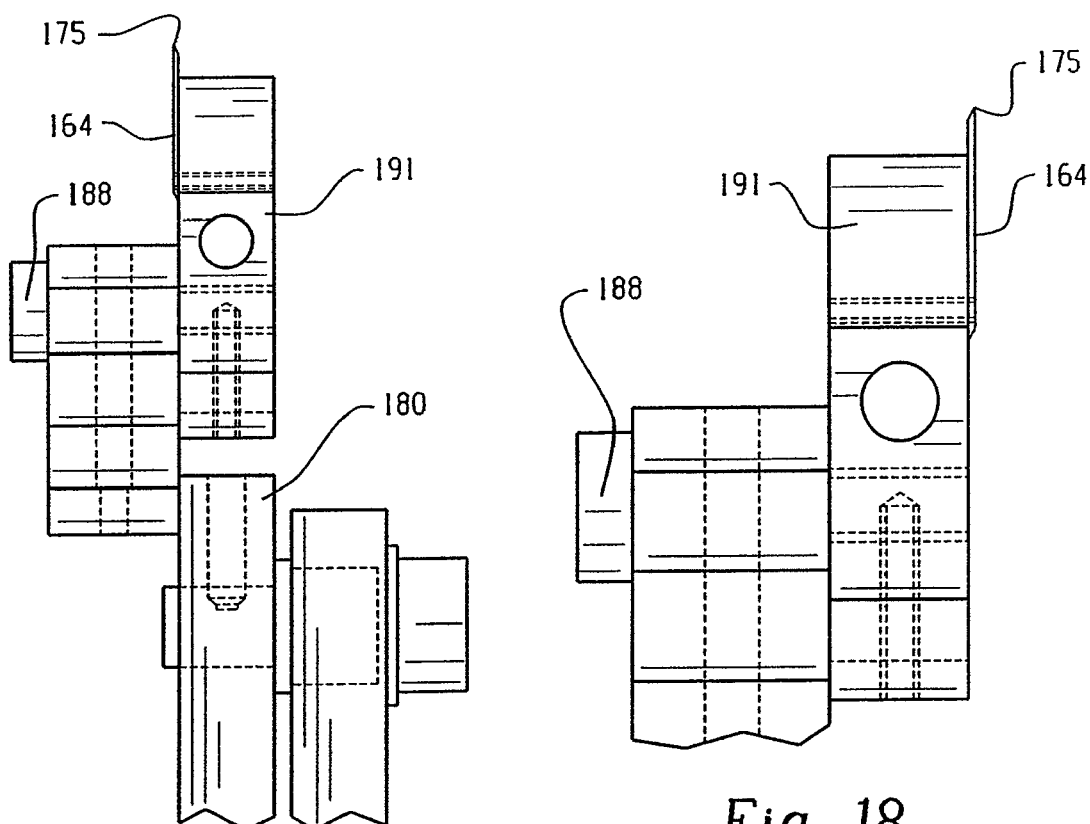
Fig. 17
Fig. 18

US 7,934,759 B2

PACKAGING SYSTEM INCLUDING PALLET DE-LAYERING SYSTEM

TECHNICAL FIELD

The present application relates to packaging equipment and more particularly to a packaging system including a pallet de-layering system.

BACKGROUND

Automated packaging machines are frequently used for packaging products for retail sale. Often times, the products are packaged by a producer or manufacturer of the product in cases. In some instances, the cases may be stacked onto a pallet forming a palletized unit so that many cases can be conveniently moved from one location to another during a single moving operation, for example, by a fork truck.

The process by which the product is packaged by the producer may not be dictated by the retailer concerns. Considering beverages, for example, it may be simpler for the producer to package beverages having the same flavor together to form a single case or even to form a single pallet. By contrast, the retailer may desire a case and/or a pallet having an assortment of flavors, for example, corresponding more to consumer demand for the various flavors. It would be desirable to provide a process and apparatus for repackaging an assortment of already packaged product, for example, for delivery to a retail location.

SUMMARY

In an aspect, in a packaging system for handling palletized product arranged in multiple layers of product cases, a pallet de-layering system includes a gripper mechanism. The gripper mechanism is configured to clamp a layer of the multiple layers by applying a clamping force to one or more product cases of the layer such that the layer can be removed from an adjacent layer of product cases to a different location. The layer includes a void between adjacent product cases. The gripper mechanism includes a void filling member carried by the gripper mechanism. The void filling member is sized and located to be positioned within the void to limit movement of the adjacent product cases into the void during a clamping operation.

In another aspect, a gripping head for use in carrying a plurality of product cases arranged in a substantially rectangular layer with at least one void space in the layer is provided. The gripping head includes a frame having a central axis and a first pair of opposing side clamps mounted on the frame. At least one of the side clamps of the first pair is moveable between outward and inward positions relative to the central axis. A second pair of opposing side clamps are mounted on the frame. At least one of the side clamps of the second pair is moveable between outward and inward positions relative to the central axis, the second pair of opposing side clamps oriented transverse to the first pair of side clamps.

In another aspect, a method of handling palletized product arranged in multiple product layers of product cases, where a product layer includes multiple cases arranged such that an interior void is located in the product layer is provided. The method includes locating a void filling member in the void of the product layer, the void filling member being carried by a gripper mechanism. The void filling member is expanded from a collapsed configuration to occupy a greater volume within the void thereby limiting movement of product cases into the void during a clamping operation. An inward clamping force is applied against a perimeter of the product layer using the gripper mechanism such that the product layer can be lifted and carried to a different location.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 1 is a diagrammatic, side view of an embodiment of a palletized unit including multiple stacked layers;

FIG. 2 is a diagrammatic, top view of an embodiment of a layer of the palletized unit of FIG. 1;

FIG. 16 illustrates an embodiment of a knife assembly for use in the film severing system of FIG. 11;

FIG. 17 is a partial, end view of the knife assembly of FIG. 16;

FIG. 18 is a detail view of the knife assembly of FIG. 16;

DETAILED DESCRIPTION

A pallet de-layering system is described below as being used in a packaging system that can be used to disassemble pallets including an initial assortment of products (e.g., beverages), combine the products originating from different, disassembled pallets and then to re-assemble the pallets so that the re-assembled pallets include an assortment of products different from their initial assortment. It should be noted that the pallet de-layering system may be used with other product handling systems.

Referring to FIG. 1, a palletized unit 10 of products 12 (e.g., beverages, such as a sports drink) includes multiple layers 14a-14h of product cases stacked upon pallet 15. As used herein, the term "pallet" refers to a portable platform for handling, storing, and/or moving materials (as in warehouses, factories, or vehicles). The palletized unit 10 may be pre-assembled by, for example, a product manufacturer or distributor. In one embodiment, the products 12 of the palletized unit 10 are all beverages having the same flavor and/or color. In other embodiments, one layer may include products of one flavor and/or color and another layer may include products having a different flavor and/or color. Other flavor and/or color assortments are also possible. For purposes of this description, however, the pre-assembled palletized unit 10 includes beverages all having the same flavor and color.

Figure 3:
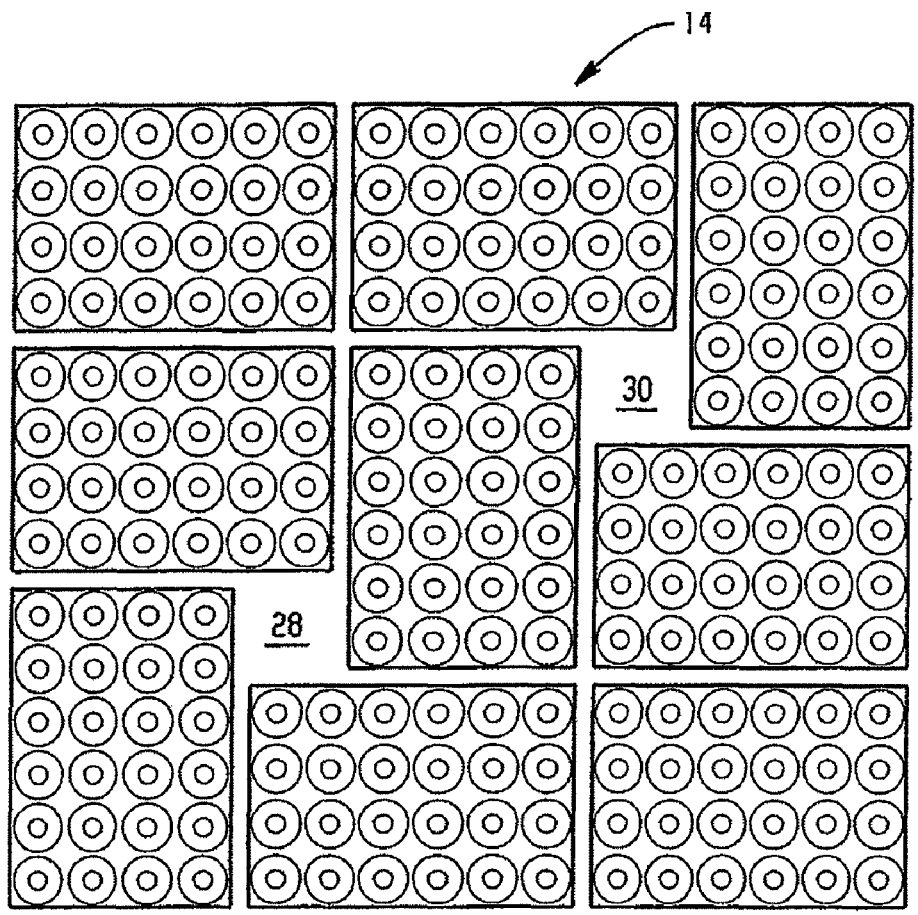
FIG. 3 is a diagrammatic, top view of another embodiment of a layer of the palletized unit of FIG. 1.

The layers 14a-14h are illustrated as being wrapped together in a plastic film 17 (e.g., by stretch wrapping). Referring also to FIG. 2, each layer 14a-14h includes multiple product cases 16a-16i in a particular arrangement where each product case includes multiple products 12 (e.g., 24 products per case). In some embodiments, each layer 14a-14h may be divided from an adjacent layer using a backing (not shown), such as a sheet of cardboard, plastic, wood, cloth, etc. The product cases 16a-16i are arranged in a particular pattern with a long axis of some of the product cases being arranged in one direction and a long axis of others of the product cases being arranged in a substantially transverse direction (e.g., see product case 16a and product case 16b). This arrangement of product cases 16a-16i creates a pair of voids 20 and 22 between adjacent cases. The voids 20 and 22 are respectively defined by portions 24a, 24b, 24d, 24e and 26e, 26f, 26h, 26i of the product cases extending beyond an adjacent case. In some embodiments, the voids 20, 22 are about 5⅝ inches or more in width. Referring to FIG. 3, in some embodiments, voids 28 and 30 of an adjacent layer 14 are located at different locations than (i.e., they are not aligned with) voids 20 and 22. In FIG. 3, voids 28 and 30 are located about 90 degrees from voids 20 and 22 of FIG. 2.

Figure 4:
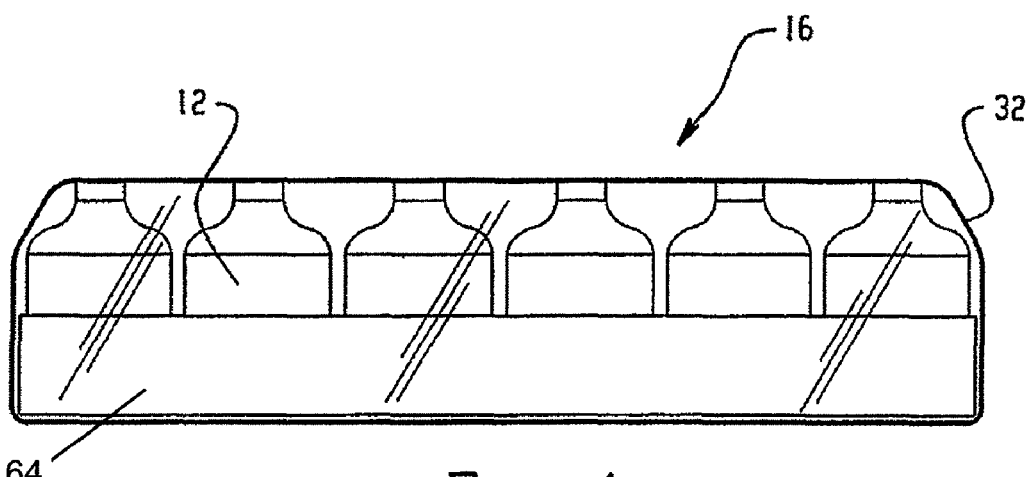
FIG. 4 is a side view of an embodiment of a product case of the palletized unit of FIG. 1.

Referring also to FIG. 4, each product case 16 of each layer 14a-14h is individually wrapped in a plastic film 32 (e.g., of shrink wrap material).

Figure 5:
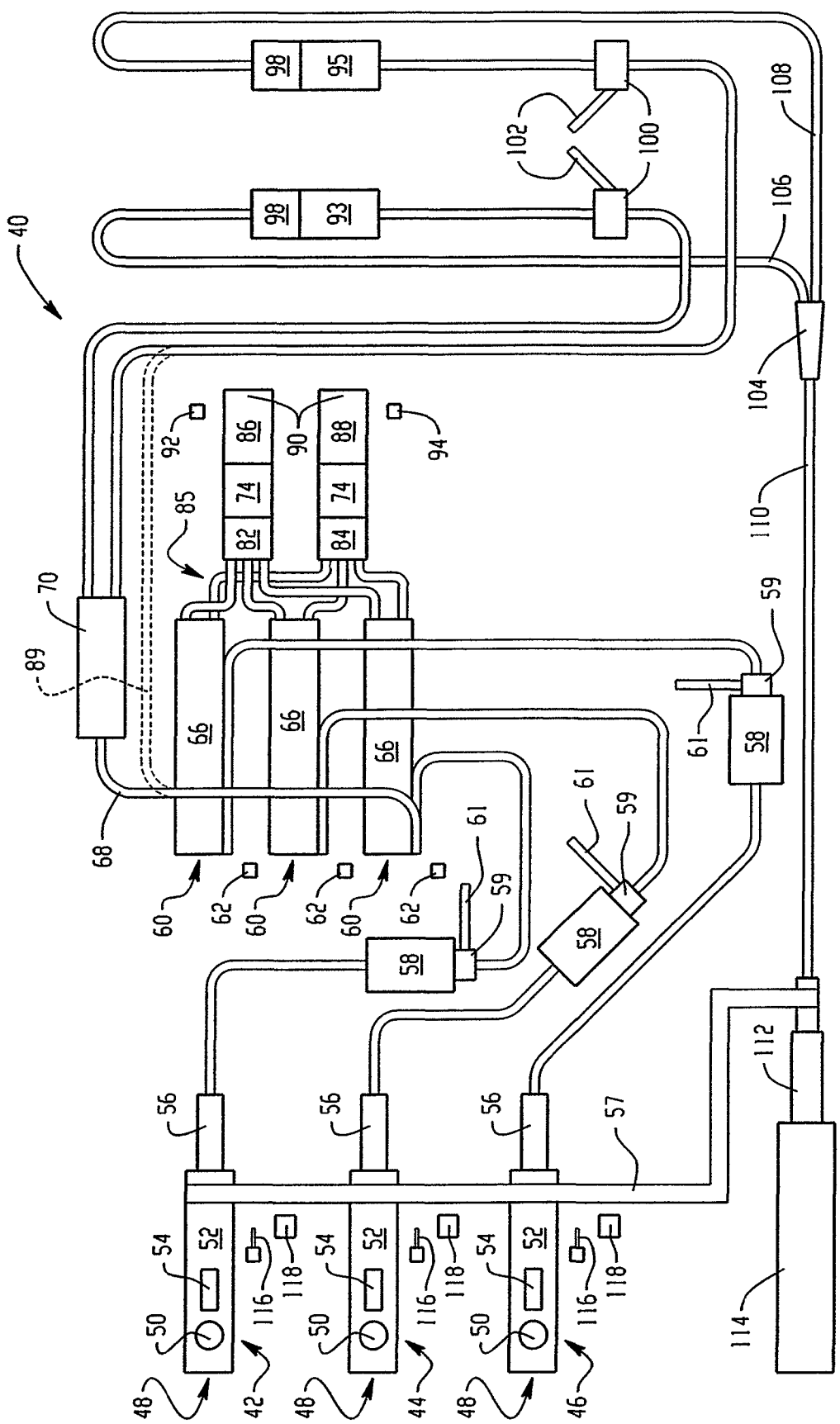
FIG. 5 is an unscaled, diagrammatic, plan view of an embodiment of a packaging system.

FIG. 5 is a diagrammatic plan view of a packaging process and system for disassembling palletized units 10 so that products 12 of different palletized units can be combined in forming another palletized unit of assorted products. Packaging system 40 includes multiple lines 42, 44 and 46 that receive and operate simultaneously on different palletized units 10. In some instances, each line may be dedicated to receive palletized units of a certain product type. For example, line 42 may receive palletized units of beverages having a first flavor and/or color, line 44 may receive palletized units of beverages having a second flavor and/or color and line 46 may receive palletized units of beverages having a third flavor and/or color. In other embodiments, two or more of the lines may receive palletized units of beverages having the same flavor and/or color, while one or more of the other lines may receive palletized units of beverages having a different flavor and/or color.

Each line 42, 44 and 46 includes a pallet infeed 48 where palletized units 10 of product 12 are introduced to the packaging system. An automated stretch film removal device 50 removes the stretch film 17 from the palletized unit 10. In some embodiments, the removed stretch film 17 is delivered along a recycle path (not shown) to a shredder and bailer system.

Once the stretch film 17 is removed, the layers 14 may be separated from each other at a layer removal station 52 including a pallet de-layering system 54. The pallet de-layering system 54 removes each layer 14 of product cases 16 one-by-one, e.g., with the palletized unit 10 at rest and places the product cases on a singulating conveyor 56. Once all the layers 14 are removed, the pallet is located on a pallet recycle path 57, which carries the pallets (e.g., by conveyor) to the input side of a palletizer 112.

As indicated above, each layer 14 includes multiple product cases 16. The singulating conveyor 56 is used to orient the product cases 16 in a desired alignment. In some instances, the product cases 16 are oriented by the singulating conveyor 56 such that their long axes are aligned with the direction of travel in single file. Other configurations are possible, however.

A film removal station 58 is used to remove the plastic film 32 from the individual product cases 16 in an in-line process. The film removal station 58 cuts the plastic film 32, removes the plastic film from the product cases 16 and sends the plastic film to the shredder and bailer system. In some embodiments, a detection system 59 (e.g., a vision system) is included. The detection system 59 may be used to detect film removal errors and/or product displacement. If a film removal error and/or product displacement is detected, the affected product case 16 may be diverted to a reject path 61.

Once the plastic film 32 is removed, the product cases 16 are directed to a product removal station 60. Robots 62 at the product removal station 60 are used to lift products 12 from their trays 64 (FIG. 4) and place the product on the product conveyor 66. Empty trays 64 are placed on a recycle path 68 that leads to a tray accumulation station 70, where empty trays wait to be delivered to a repacking station 86, 88. In some embodiments, empty trays 64 may bypass the accumulation station 70 and be sent directly to the repacking station 86 and 88 as indicated by bypass path 89 of FIG. 5.

The individual products 12 are delivered by the product conveyors 66 to a metering system 74. Prior to reaching the metering system 74, however, the three product lines 42, 44 and 46 are merged into two product lines 82 and 84 at merging station 85. As can be appreciated, by merging the three product lines 42, 44, 46 into two product lines 82, 84, an assortment of products associated with each product line 82 and 84 can be achieved. In the illustrated embodiment, each product line 42, 44 and 46 feeds product into each product line 82 and 84. The two product lines 82, 84 are associated with two repacking stations 86 and 88 where trays 64 are repacked with an assortment of products 12 that is different than their initial assortment.

The metering system 74 is used to meter out products based on a desired case product assortment. In some embodiments, the desired case product assortment is determined by the retailer based, for example, on consumer demand for each product type. As will be described in greater detail below, the metering system 74 is used to control the amount of each product flavor and/or color repacked into the trays 64.

The metered out product 12 is fed to outfeed 90. The amount of product 12 fed to the outfeed 90 corresponds to the number of products carried by the trays 64 and the number of trays to be repacked at a time and the assortment of the products is predetermined as indicated above.

Robots 92 and 94 are used to transfer the assortment of products 12 from the outfeed 90 to the trays 64, which are delivered from the tray accumulation station 70 or product removal station 60. The repacked trays 64 have a product assortment that is different from their original product assortment. In some embodiments, the robot 92, 94 repackages more than one tray 64 at a time, such as four trays at a time at the repacking stations 86 and 88. After the trays 64 are repacked with the desired assortment of products 12 forming repacked product cases (e.g., at a rate of about 35 repacked product cases per minute), the repacked product cases are delivered to a shrink wrap system 93, 95 where the repacked product cases are rewrapped with shrink wrap film (e.g., e.g., at a rate of between about 35 and about 70 cases per minute) and delivered through a shrink film shrinking station 98 (e.g., that heats the shrink film for a shrinking operation). In some embodiments, a detection system 100 is provided that detects whether the trays 64 are correctly repackaged, for example, looking at number of products (or filled product spaces), product color, etc. If a repacked product case is not correctly repacked, that case may be diverted onto reject path 102, before it reaches the shrink wrap station.

The repacked product cases are then delivered from the shrinking station 98 to a merging station 104 that merges conveyor lanes 106 and 108 into a single lane 110. The repacked product cases are then palletized at the palletizer 112 by arranging and stacking the repacked product cases onto the pallets 15 transported from the de-layering system 54. In some embodiments, the palletizer 112 stacks the repacked product cases onto the pallets 15 in substantially the same arrangement as described above with reference to FIGS. 1-3 to form a palletized unit of assorted products. Alternatively, the palletizer 112 may stack the repacked product cases in some other arrangement, for example, dictated by the retailer. The palletized units are then stretch wrapped at a stretch wrap station 114 and transported from the packaging system 40.

The Pallet De-Layering System

As indicated above, the pallet de-layering system 54 removes each layer 14 of product cases 16 one-by-one and places the product cases on the singulating conveyor 56. The pallet de-layering system 54 includes a robot arm 116 (e.g., capable of both lateral, vertical and rotational movement) with a gripper mechanism 118 that can be moved by the robot arm 116 over to the palletized unit 10 to grip each layer 14 in consecutive gripping operations. A suitable robot arm is a M-410 Intelligent Palletizing Robot, commercially available from Fanuc, Ltd.

Figure 6:
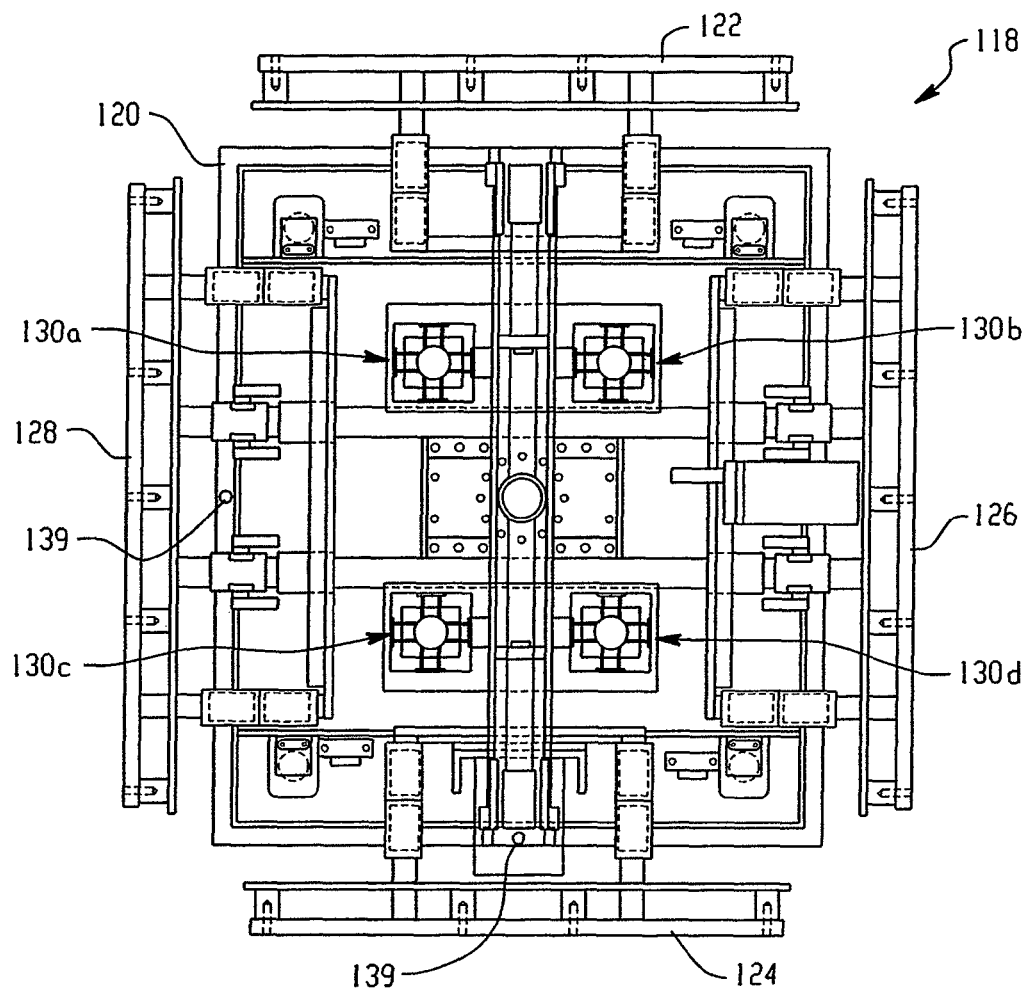
FIG. 6 is a bottom view of an embodiment of a gripping mechanism for use in de-layering the palletized unit of FIG. 1.

Referring to FIG. 6, the gripper mechanism 118 is somewhat square in shape (e.g., corresponding to the shape of each layer 14) and includes a frame 120 and opposing grippers 122, 124 and 126, 128. The opposing grippers 122, 124 and 126, 128 have a gripping surface that extends substantially parallel to respective edges of the layer 14 and are moveable (e.g., pneumatically, motor driven, etc.) inwardly toward each other in order to apply a gripping force (e.g., of between about 1508 lbs and about 2010 lbs) to product cases 16 of a layer 14 of the palletized unit 10. In an alternative embodiment, only some of the grippers may be moveable (e.g., such as grippers 122 and 128 or grippers 128 and 124 or grippers 124 and 126 or grippers 126 and 122) and the other grippers stationary.

Referring briefly back to FIG. 2, layers 14 of product cases 16 include a pair of voids (e.g., voids 20, 22) located between adjacent product cases. These voids 20, 22 tend to allow the product cases 16 to move inwardly when a gripping force is applied to the periphery of the layer 14, which may increase the probability of an ineffective gripping operation.

Figure 7:
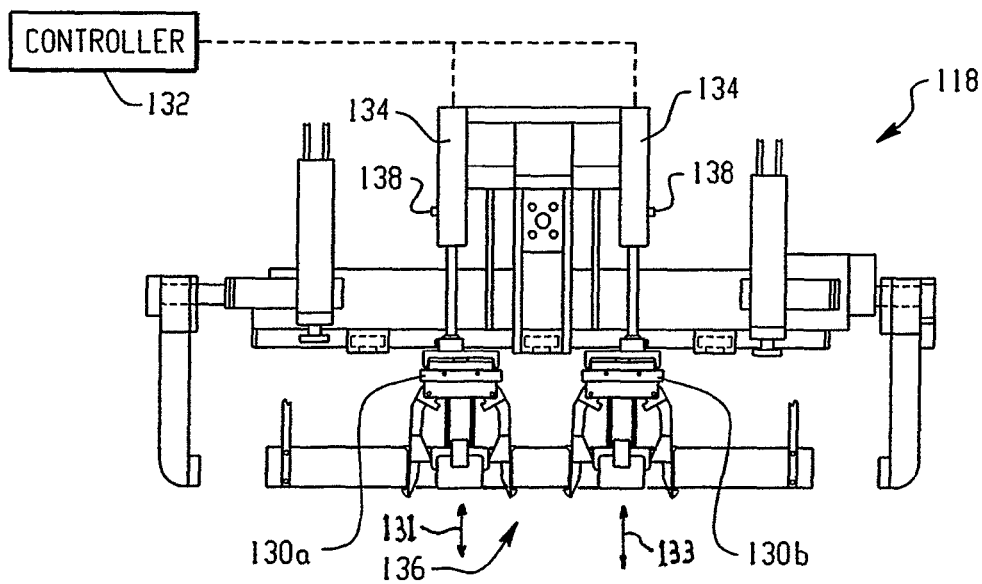
FIG. 7 is a side view of the gripping mechanism of FIG. 6.

To obviate the possible effect of the voids on the gripping operation, the gripper mechanism 118 includes expanders 130a-130d shown in FIGS. 6 and 7. As represented by arrows 131 and 133, the expanders 130 are vertically moveable up-and-down relative to the frame 120 so that they may be placed into voids, when applicable. The expanders 130a-130d also have a collapsed configuration (FIG. 8A) and an expanded configuration (shown by FIGS. 7 and 8B). The collapsed configuration is used when extending the expanders 130 and inserting the expanders into the voids and the expanded configuration is used to occupy a greater volume within the voids relative to the collapsed configuration to inhibit movement of the adjacent product cases 16 into the voids.

In some embodiments, a controller 132 is used to control operation of the gripper mechanism 118 including grippers 122, 124, 126 and 128 and expanders 130. The pairs of grippers 122, 124 and 126, 128 may be mechanically linked so that they move together (e.g., in opposing pairs) or they may each move independently. The expanders 130, in the illustrated embodiment, are driven using pneumatics 134. The controller 132 controls actuation of the pneumatics 134 using a void detection system 136. The void detection system 136 includes sensors 138 that can be used to detect the presence of a void and to send a corresponding indication to the controller 132. In one embodiment, magnetic sensors 138 are associated with the pneumatic cylinders to detect movement of the cylinder rods out of their extended positions. However, other void detection sensing systems could be used. The controller 132, upon receipt of the indication, raises and/or lowers the corresponding expanders 130 relative to the frame 120 as needed to fill the identified voids. Once the extended expanders 130 are in the voids, the controller 132 then expands the expanders to their expanded configurations.

For example, layer 14 of FIG. 2 has voids 20 and 22 at the illustrated positions. The gripper mechanism 118 includes layer edge detecting sensors 139, each sensor used by the controller 132 to detect an edge 141a and 141b of the layer 14, which can be used by the controller to center the gripper mechanism above the layer. In some embodiments, the edge detecting sensors 139 may be used for each layer, only some layers or even only the top layer. The expanders 130a-130d are initially in their lowered positions and the gripper mechanism 118 is lowered onto the layer 14. As the gripper mechanism 118 is lowered, expanders 130a and 130d contact product cases 16, which forces the expanders 130a and 130d to move upward. The magnetic sensors 138 are used to detect this movement, which indicates that expanders 30a and 30d are not aligned with voids 20 and 22. The lack of any signal change from the sensors 138 associated with the expanders 130b and 130c indicates that these expanders are aligned with respective voids 10, 22. The controller 132 then controls the pneumatics to raise the expanders 130a and 130d. Expanders 130b and 130c are lowered into the voids 20 and 22 as the gripper mechanism 118 is lowered into its gripping position.

For layer 14 of FIG. 3 having voids 28 and 30, the controller 132, upon receipt of the indication from the detectors 138, retracts expanders 130b and 130c as expanders 130a and 130d are lowered into the voids 28 and 30. In alternative embodiments, the expanders 130 may be lowered relative to the frame 120 before, while or after the gripper mechanism 118 is lowered onto the respective layer 14 for the gripping operation.

Figure 8A:
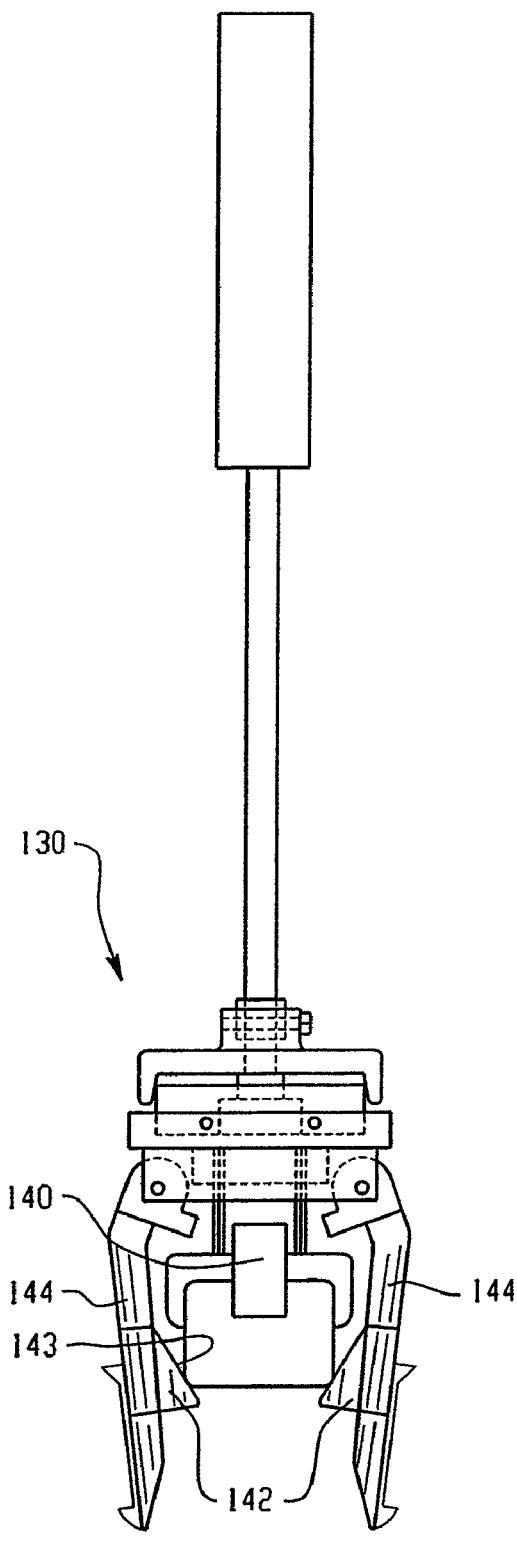
FIG. 8A is a side view of an embodiment of an expander in a retracted configuration for use with the gripping mechanism of FIG. 6.
Figure 8B:
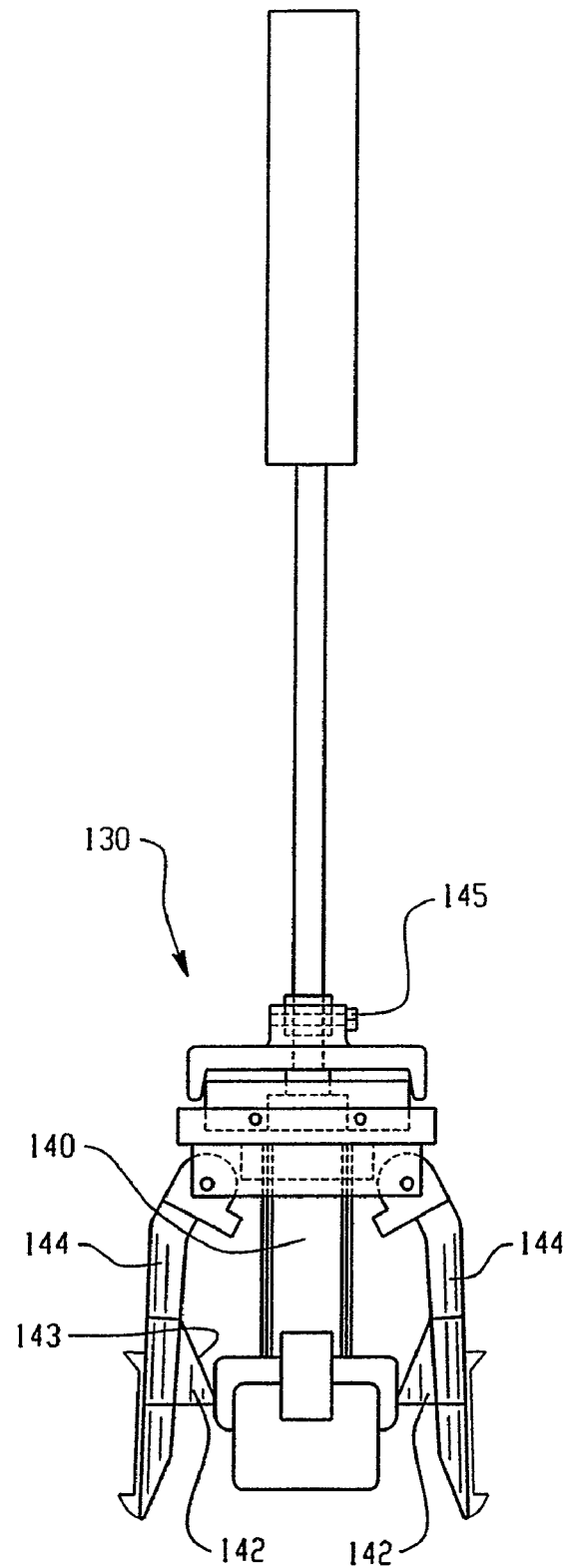
FIG. 8B is a side view of the expander of FIG. 8A in an expanded configuration for use with the gripper mechanism of FIG. 6.

Once the appropriate expanders 130 are in the voids 20, 22, 28, 30, they are expanded using an actuator 140 (e.g., an air cylinder), which is connected to linkages 142 shown most clearly by FIGS. 8A and 8B. The linkages 142 cause pivot arms 144 to pivot outwardly as the actuator 140 extends to its position illustrated by FIG. 8B by riding along angled surfaces 143 of the linkages. In some embodiments, the expander 130 locks in its expanded position during layer gripping.

Locking the expander 130 in its expanded position inhibits the collapse of the expander during a gripping operation, even if pneumatic pressure is lost, which can decrease the probability of a failed gripping operation. Specifically, when the grippers 122, 124, 126 and 128 move to engage the sides of the pallet layer 14, the product cases 16 responsively move and apply pressure against the expander pivot arms 144. This in turn causes the pivot linkages 142 to press against the lowered portion of the actuator 140, thereby holding the actuator against upward movement until the side grippers 122, 124, 126 and 128 are moved to release the layer 14. In some embodiments, springs (not shown) are used to spring bias the pivot arms 144 toward their collapsed configurations.

Figure 10:
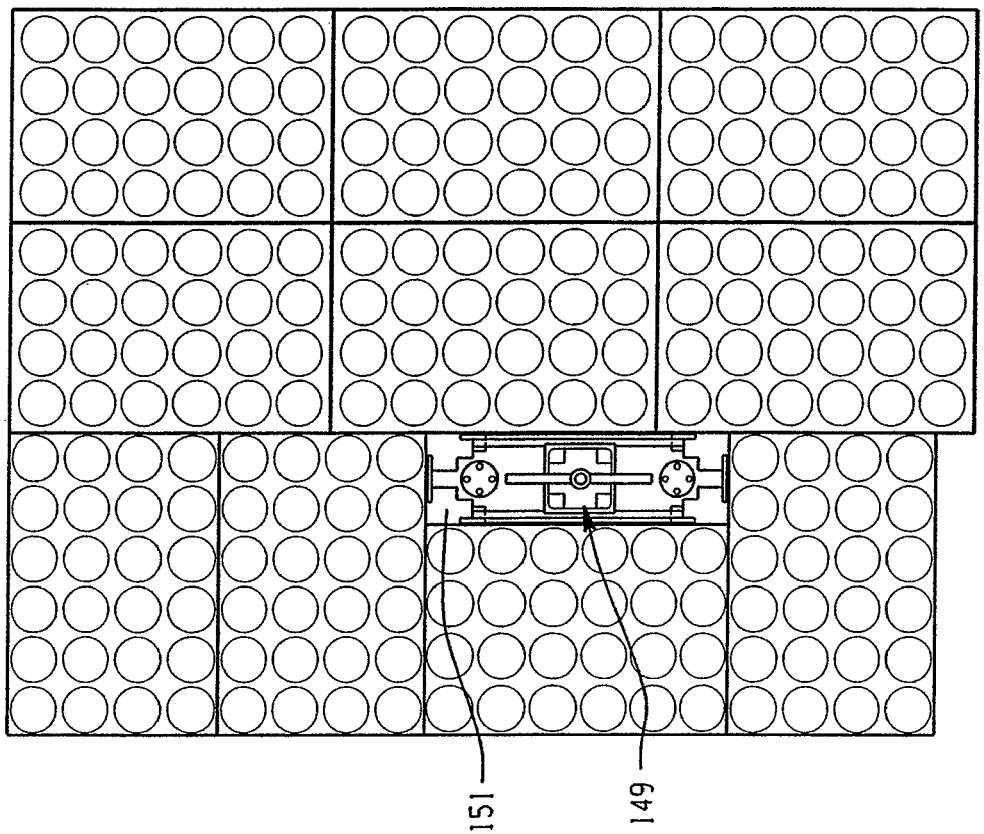
FIG. 10 is a top view of another embodiment of an expander for use with the gripper mechanism of FIG. 6 within a rectangular-shaped void.
Figure 9:
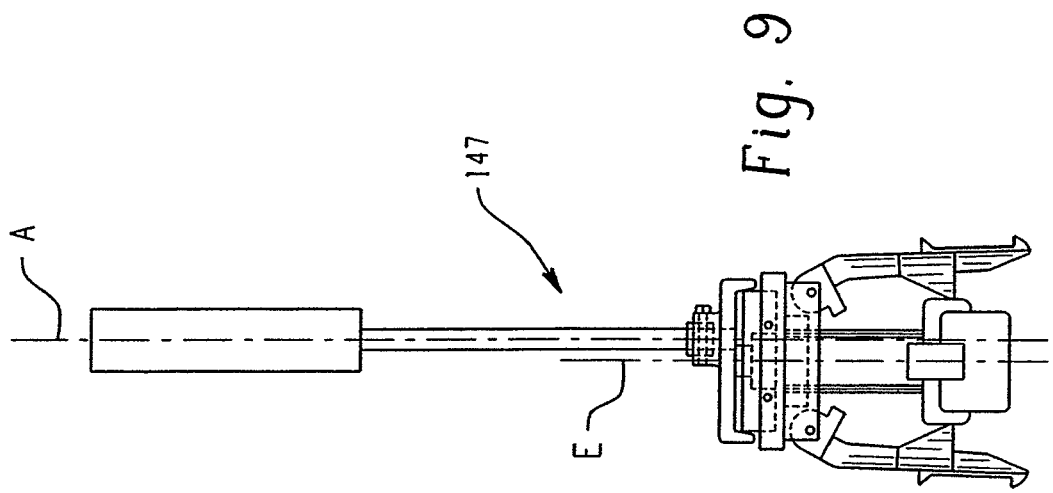
FIG. 9 is a side view of another embodiment of an expander for use with the gripper mechanism of FIG. 6.

In some implementations, the locations, sizes and/or shapes of the voids may change, for example, depending on product and/or product case characteristics, such as size/shape of the product container, number of products per product case, etc. Thus, it may be desirable to provide the gripper mechanism 118 with interchangeable expanders and/or provide the gripper mechanism with the capability to change the positions of the expanders relative to the frame 120. Referring to FIG. 8B, for example, the expander 130 includes a quick disconnect pin 145 that can be used to disconnect the expander 130 from the lower end of the pneumatic cylinder rod, which remains with the gripper mechanism 118. Removal of the pin and disconnecting of the air lines that operate the cylinder 140 allows the expander 130 to be readily removed. Expander 147 of FIG. 9 may then be connected to the gripper mechanism that includes an offset design where the expander 147 has an actuation axis E that is offset from an actuation axis A. The offset actuation axis configuration is used to account for differences in void location as between pallet layers for different products. Various other expander configurations are possible. For example, referring to FIG. 10, a rectangular expander 149 is shown within a rectangular void 151.

In some implementations, the gripper mechanism 118 may also be used to move the pallet 15 onto the pallet recycle path 57 (FIG. 5) after all the layers 14 are removed there from. The controller 132, in this instance, may not lower any of the expanders 130 as the detectors 138 may not detect any voids. Similar to moving the layers 14, the gripper mechanism 118 may grip the pallet 15 using gripper pairs 122, 124 and 126, 128 to apply a gripping force to the pallet.

The Film Removal Station

Figure 11:
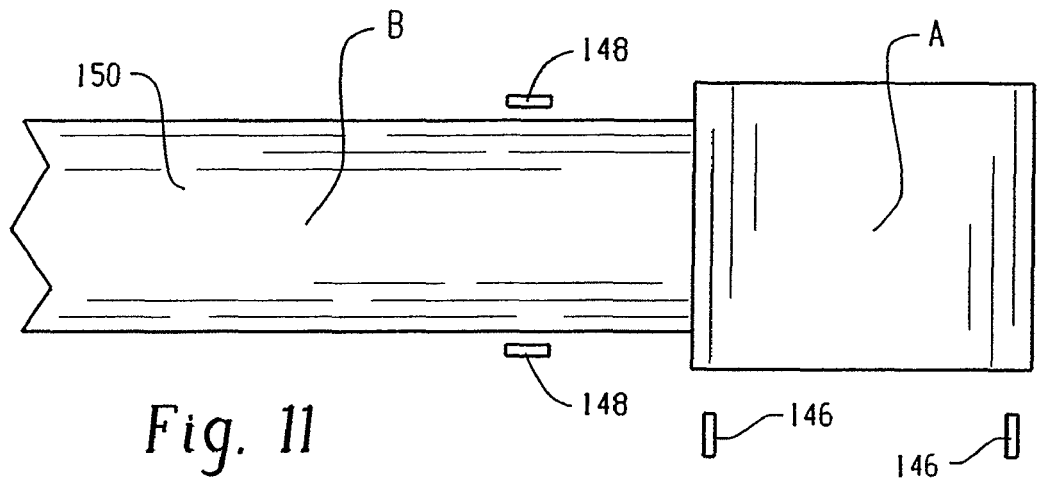
FIGS. 11 and 12 are diagrammatic, plan views of an embodiment of a film severing system.
Figure 12:
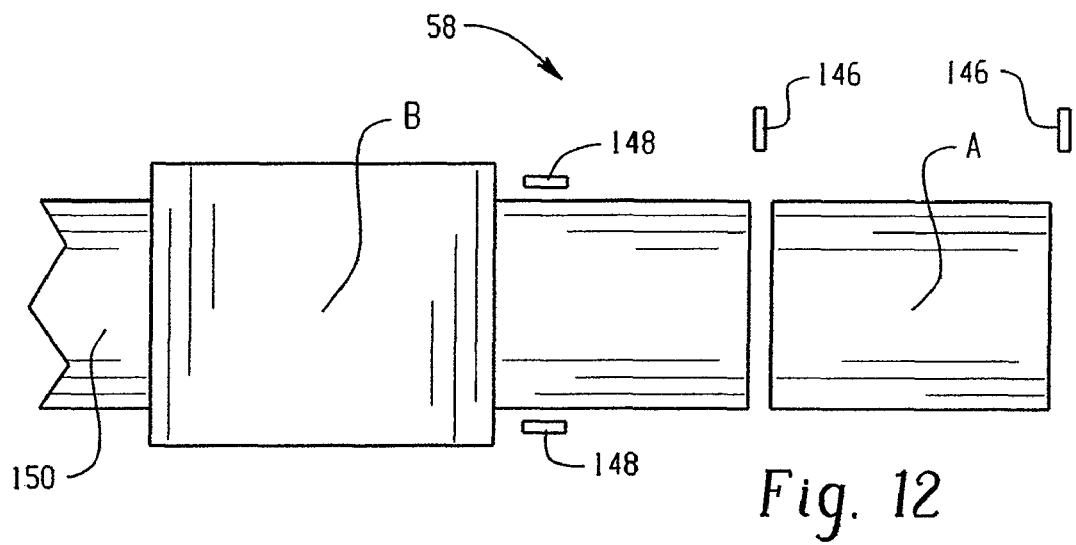

The film removal station 58 (FIG. 5) is used to remove the plastic film 32 (FIG. 4) from the individual product cases 16 in an in-line process. Referring to FIG. 11, a film cutting process for use in removing the plastic film 32 is illustrated diagrammatically. The film removal station 58 includes a first knife pair 146 and a second knife pair 148. The first knife pair 146 is illustrated as being initially outside of and oriented substantially perpendicular to the conveyor path 150, while the second knife pair 148 is located at opposite edges of and oriented substantially parallel to conveyor path 150, downstream of the first knife pair. As the product case 16 is held stationary at location A, the first knife pair 146 is moved across the conveyor path and cuts the plastic film 32 along opposite bottom edges 156, 158 of the product case 16 (see FIG. 13). Referring to FIG. 12, with the product case 16 moving to location B, the second knife pair 148 utilizes the movement of the product case to cut the plastic film 32 along opposite bottom edges 152, 154 (see FIG. 13). In some embodiments, element 159 is a conveyor segment that allows the first knife pair 146 to pass thereby. As an alternative, element 159 may be one or more spaced rollers that are arranged and configured to allow the first knife pair 146 to pass thereby.

Figure 13:
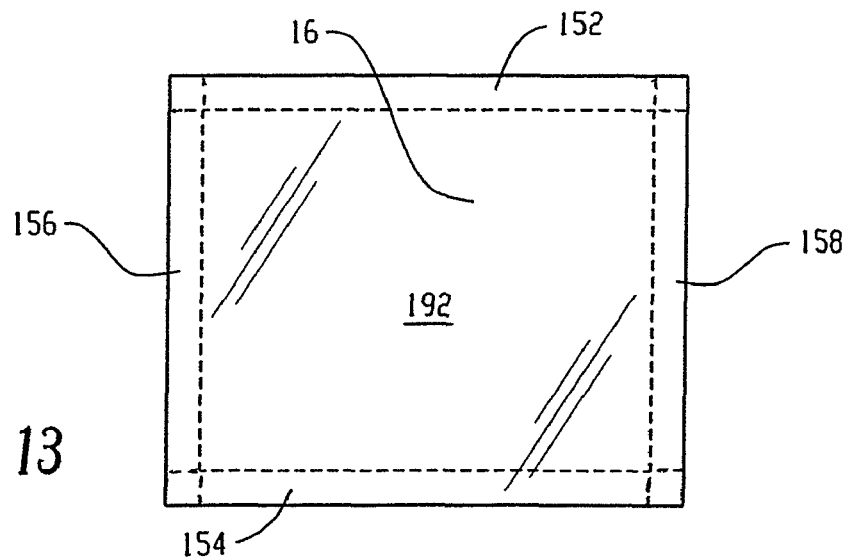
FIG. 13 is a diagrammatic, bottom view of a product case.

Referring now to FIG. 13, the knife pairs 146, 148 cut the bottom of the plastic film entirely across the length and width of the bottom. The first knife pair 146 cuts at a bottom leading edge (e.g., at most about 1 inch or less from the leading edge, such as about ½ inch) and at bottom trailing edge (e.g., at most about 1 inch or less from the trailing edge, such as about ½ inch) of the product case 16, while the second knife pair 148 cut at bottom machine direction edges (e.g., at most about 1 inch or less from the trailing edge, such as about ½ inch) of the product case. These full cross-cuts allow for easier removal of the plastic film 32, as will be described below.

Figure 14:
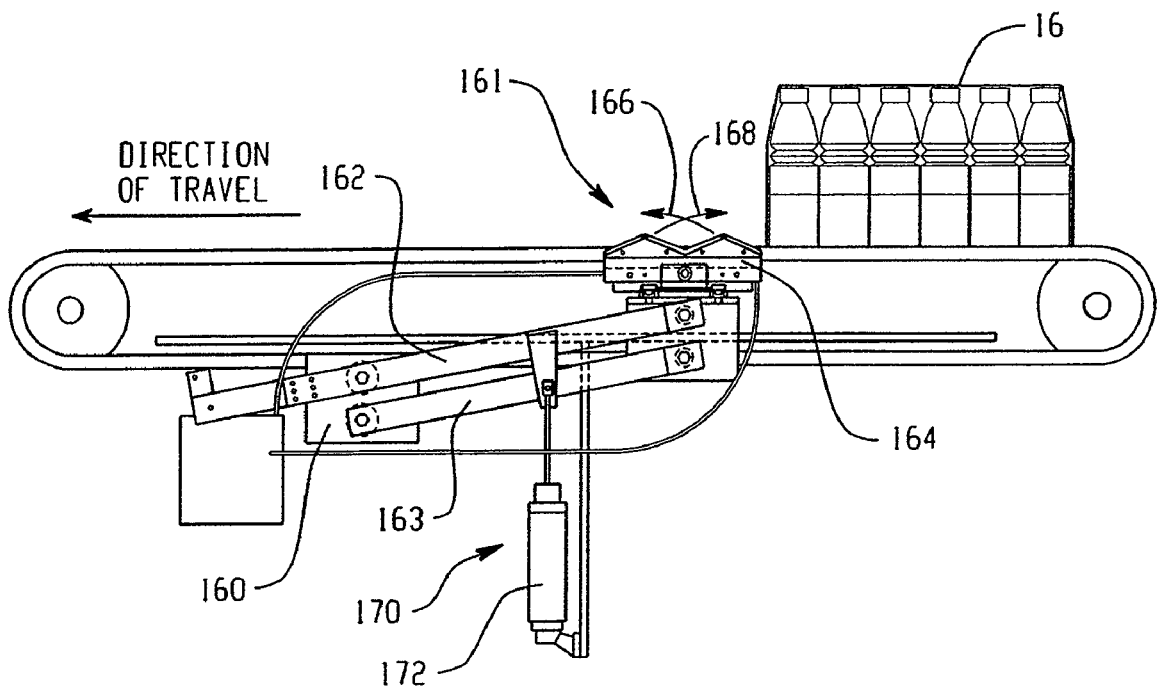
FIGS. 14 and 15 are side views of a portion of the film severing system of FIG. 11.
Figure 15:
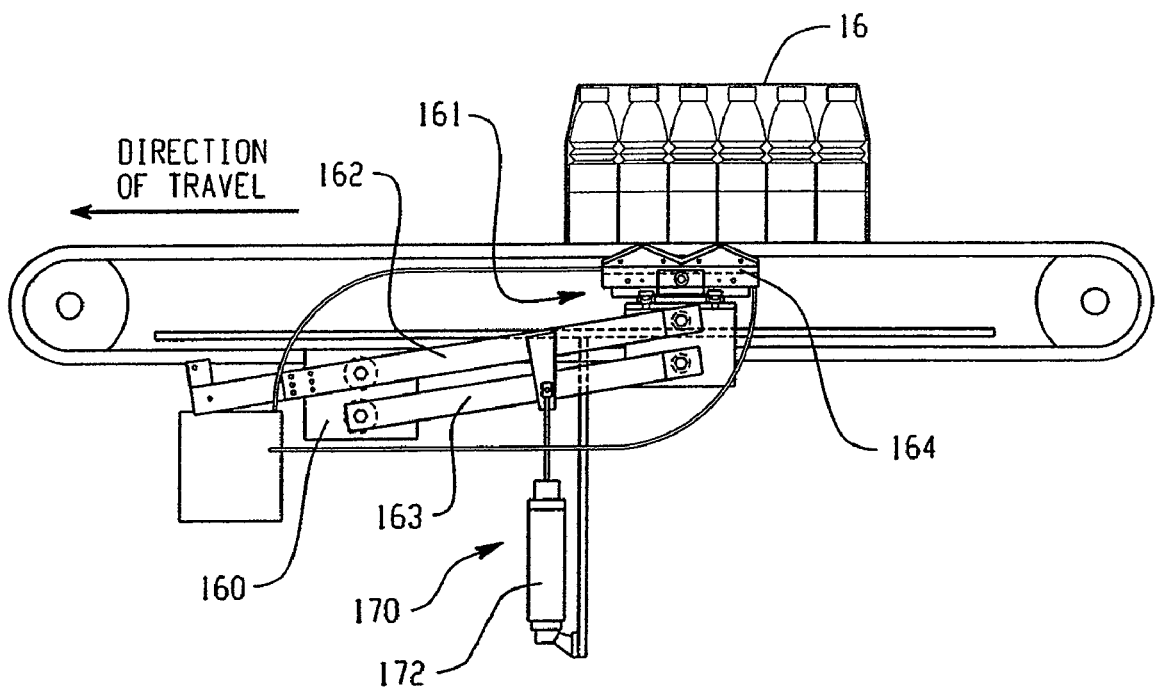

FIGS. 14 and 15 show a heated knife assembly 161 of the second knife pair 148 in greater detail. Referring first to FIG. 14, the heated knife assembly 161 includes a mount 160 and parallel arms 162 and 163 pivotally connected to the mount. A heated knife 164 is mounted to the arms 162. The heated knife 164 is pivotally mounted to the arms 162 and 163 so that the knife can pivot in the direction of arrows 166 and 168 to accommodate tray bottom irregularities and to assure the knife cut is made all the way to the edge of the product case 16.

The heated knife 164 is biased upwardly by biasing mechanism 170 that is connected to the arms 162. Biasing mechanism 170 includes an air cylinder 172 that acts as an adjustable spring supplying a vertical biasing force that can be used to hold the heated knife 164 against the bottom of the product case 16 (see FIG. 15). The first knife pair 146 can include similar pivoting and biasing structure.

Referring to FIGS. 16-18, the heated knife 164 has a double truncated pyramid shape with two peaks 174 and 176 separated by a valley 178. As can be seen best by FIG. 18, the cutting edge (see element 176) of the heated knife 164 is thin and sharpened to a point to provide for film burn off, which can improve cutting during use. Peaks 174 and 176 include the cutting surfaces. A cartridge heater 190 is used to heat the knife 164. An insulating base 180 supports the heated knife 164. A pair of wave springs 182 and 186 located on opposite sides of pivot joint 188 provide opposing biasing forces that are used to bias the heated knife in the illustrated horizontal position. The cutting edge 175 of the knife 164 is heated to a temperature such that during the cutting operation, the plastic film 32 melts away from the knife, which along with the sharpened edge 175 can improve film burn off and inhibit accumulation of plastic on the cutting edge. In some embodiments, the knife 164 is heated to a temperature between about 800 and 900 degrees F.

The two peak construction of the knife cutting edge 175, in combination with the pivoting action, enables a single pass of a knife against the bottom of a case to perform two cuts along the same line, but separated slightly in time. These two cuts separated in time can be advantageous for cutting thicker or multilayer plastic film.

Figure 19:
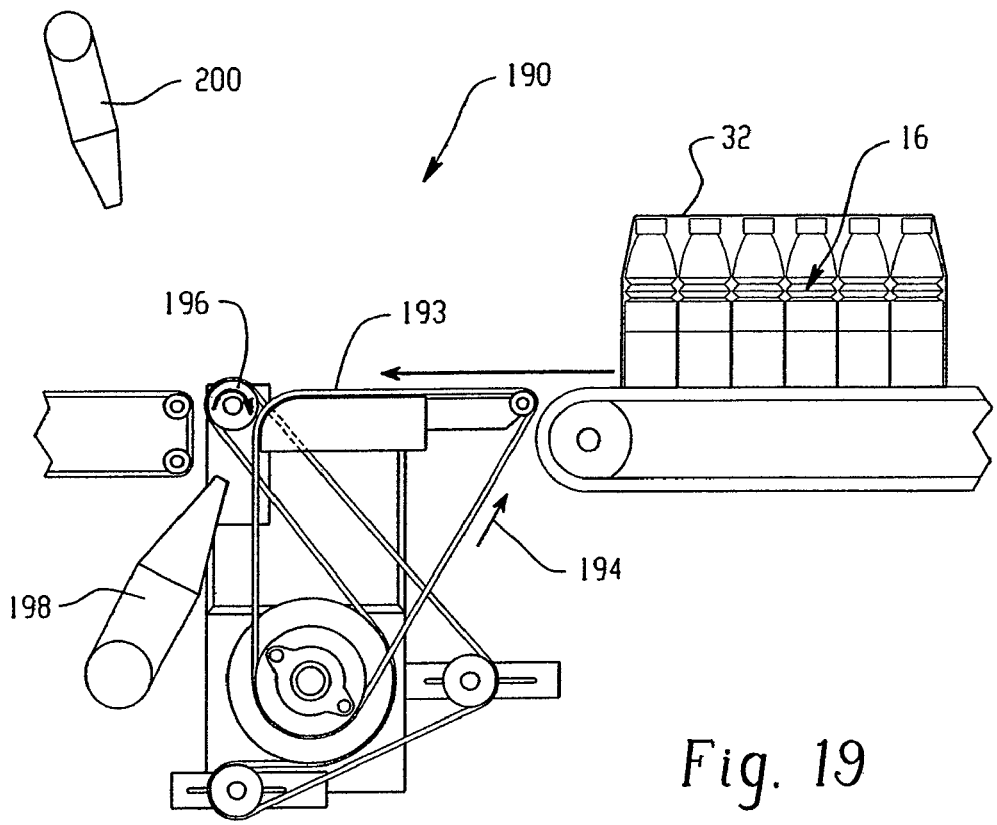
FIGS. 19 and 20 are side views of an embodiment of a bottom film removal station.
Figure 20:
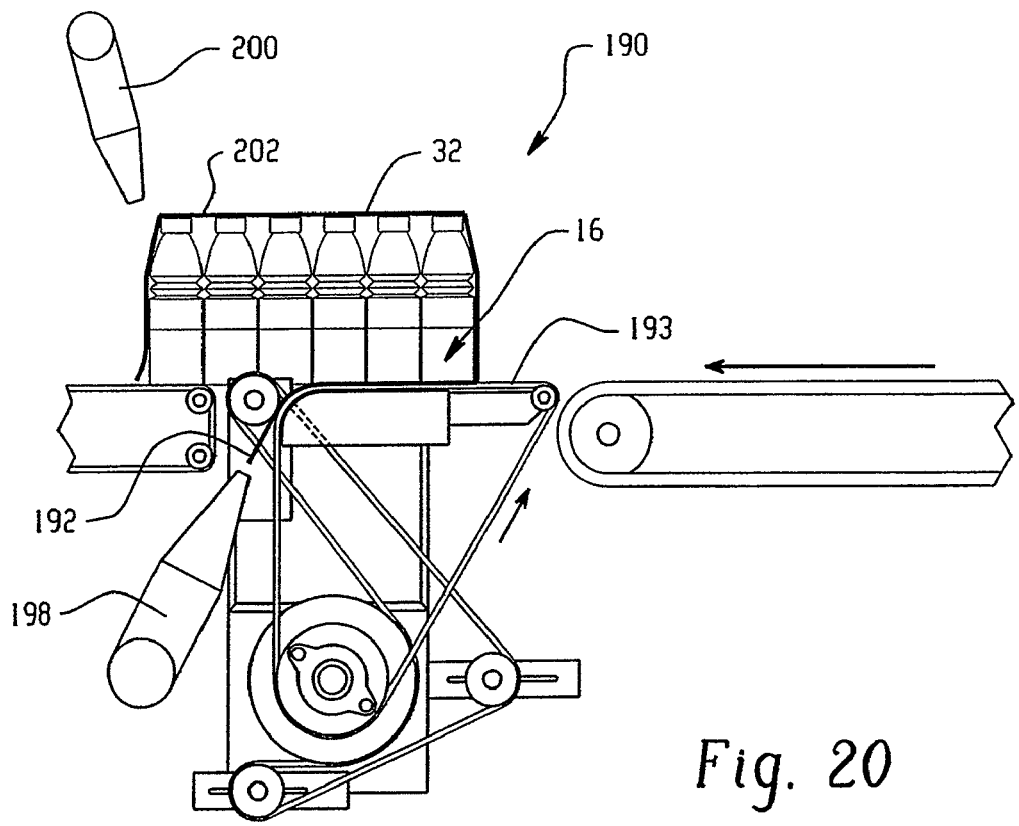

Referring to FIG. 19, a bottom film removal station 190 is used to remove a portion 192 (FIG. 14) of the plastic film 32 from the product case 16 after it has been cut. Bottom film removal station 190 includes a bottom vacuum conveyor 193 that moves in the direction of arrow 194 and a counter rotating nip roller 196. A film vacuum removal nozzle 198 is located below the counter rotating nip roller 196. Referring to FIG. 20, the film portion 192 is pulled between the counter rotating nip roller and the bottom vacuum conveyor 192 as the product case 16 moves thereover. The removed film portion 192 is then drawn into the film vacuum removal nozzle 198 using negative pressure. A second film vacuum removal nozzle 200 is then used to draw a remaining portion 202 of the plastic film 32 from the product case 16, thereby removing the plastic film. As noted above, the full cross-cuts 152, 154, 156, 158 facilitate removal of the portions 192 and 202 of the plastic film 32.

Figure 21:
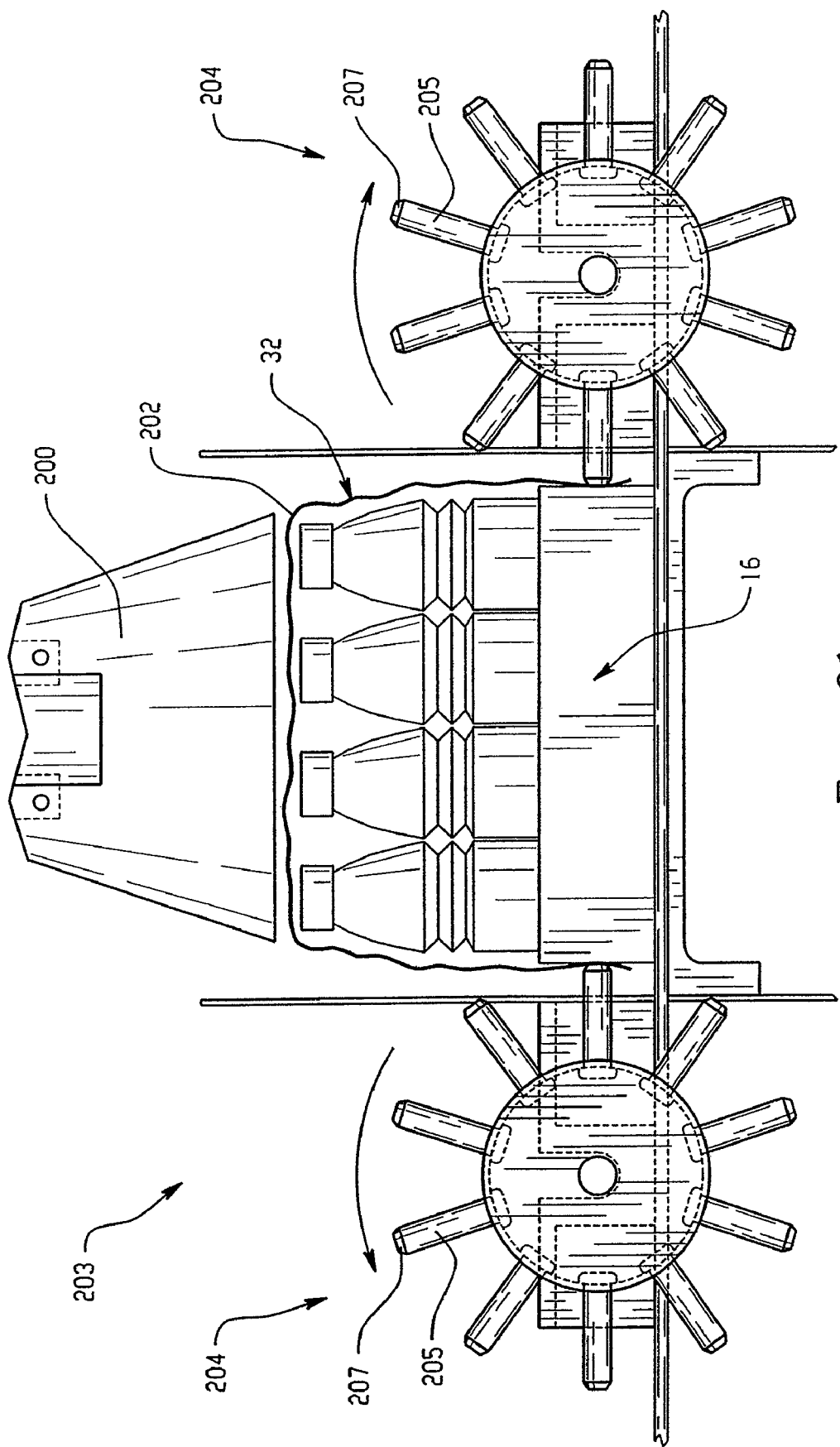
FIG. 21 is a front view of an embodiment of a film lifting device.

Referring to FIG. 21, in some embodiments, a film lifting device 203 is used to lift the remaining portion 202 of the plastic film 32 from the product case 16 prior to reaching the vacuum removal nozzle 200. In the illustrated embodiment, counter-rotating mechanisms 204 are placed on opposite sides of the case conveying path and include includes rotating fingers 205 (e.g., having rubber ends 207) that come into contact with the remaining portion 202 of the plastic film 32 and apply a lifting force to the plastic film at the machine direction sides of the product case. The lifting force loosens the remaining portion 202 of the plastic film 32, which is then removed using the vacuum nozzle 200.

Product Metering System

Figure 22:
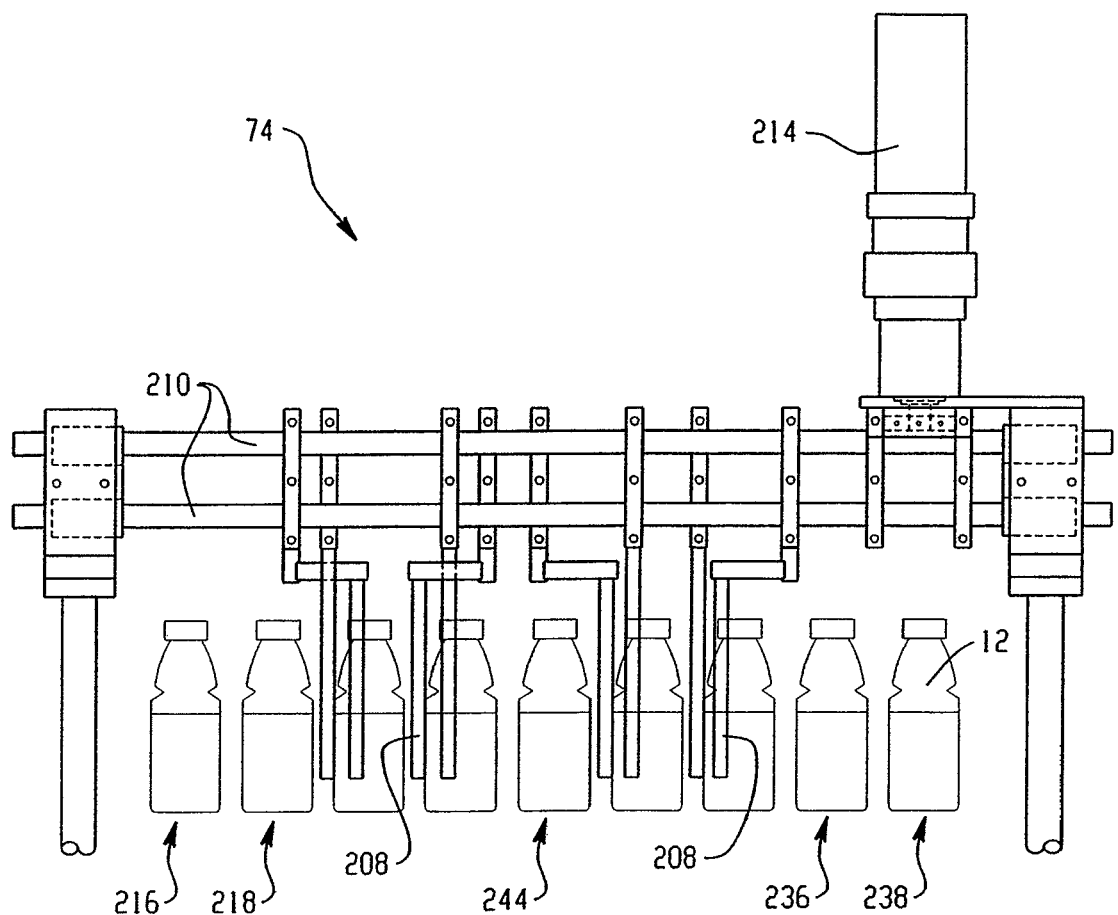
FIGS. 22 and 23 are front and top views, respectively, of an embodiment of a product metering system.
Figure 23:
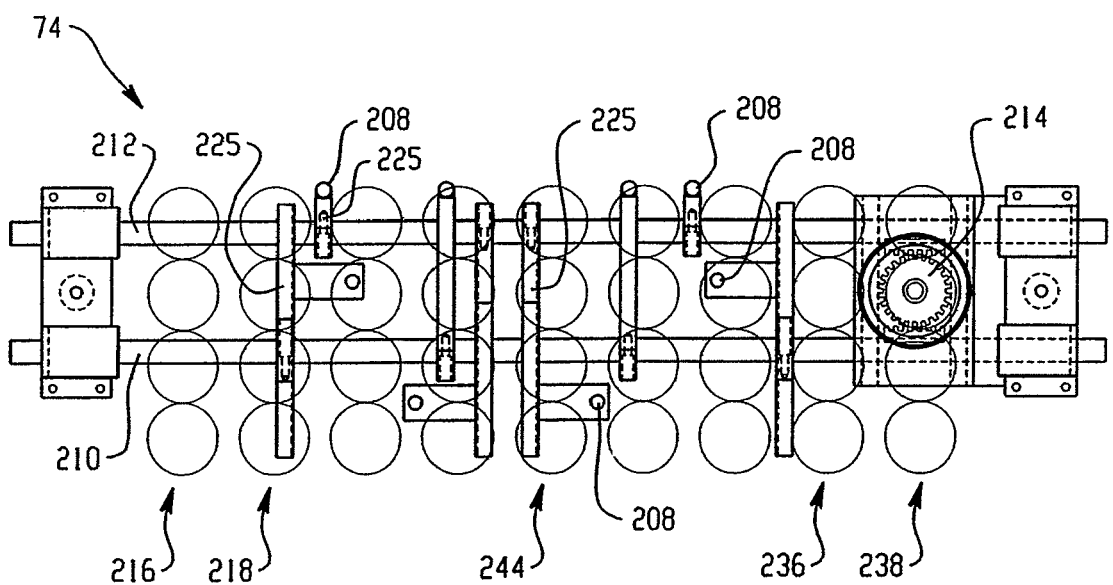

Once the plastic film 32 is removed, the product cases 16 are directed to the product removal station 60 where the robots 62 lift products 12 from their trays 64 and place the product on the product conveyor 66 (FIG. 5). The individual products 12 are delivered to the metering system 74. FIGS. 22 and 23 illustrate the metering system 74 associated with one of the product lines 82 or 84. The metering system 74 is used to control the amount of a certain product flavor and/or color delivered to the repacking stations 86 or 88.

Pins 208 are used as removable barriers to control feeding of products 12 from certain product columns, which columns are separated by rails which are not shown. The pins 208 are connected to rails 210 and 212, which are operatively connected to a reversible motor 214 (e.g., using a rack and pinion drive) so that the motor can slide the rails 210 and 212 back and forth to move the pins into and out of the associated product path. The end product columns 216, 218, 236, 238 and middle product column 244 do not have any associated pins 208 so that products travel through these columns unimpeded.

Figure 24:
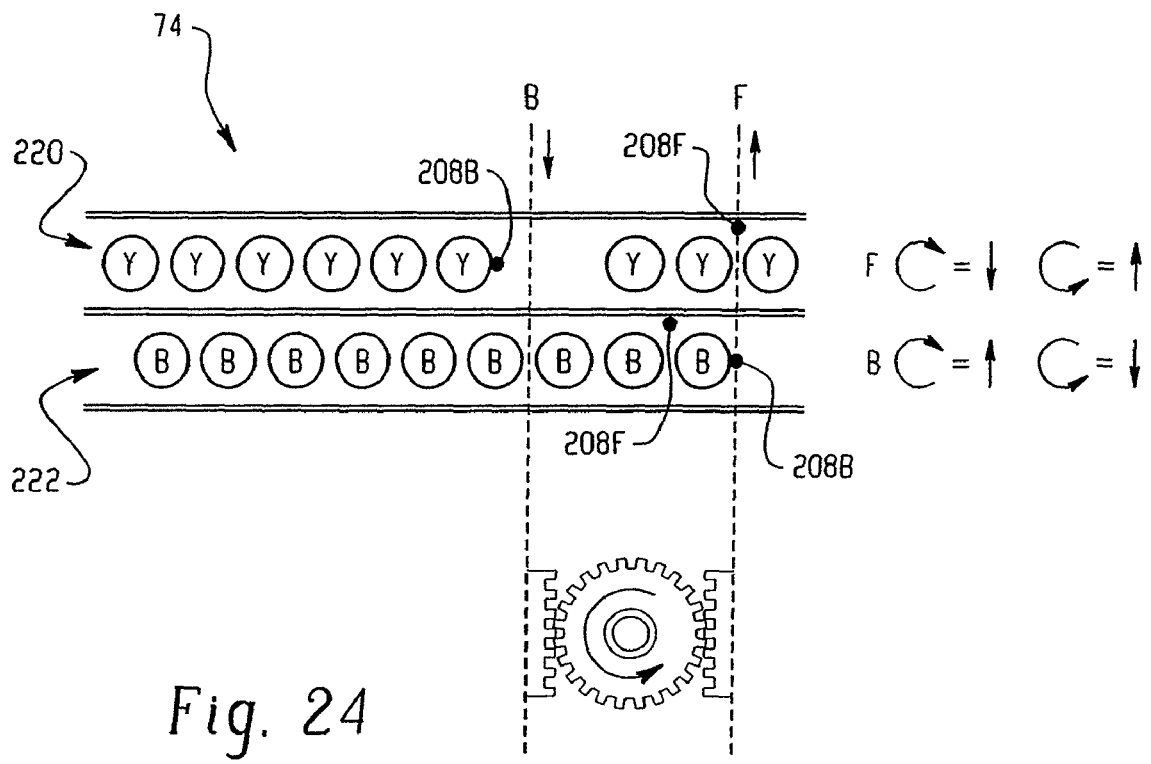
FIGS. 24 and 25 are diagrammatic, exemplary plan views illustrating operation of the product metering system of FIG. 19.

FIG. 24 shows a diagrammatic, simplified metering system 74 to illustrate its operation in metering products. The illustrated metering system 74 includes a first product path 220 and a second product path 222. Products Y of a first flavor and/or color (e.g., yellow) travel along path 220 and products B of a second flavor and/or color (e.g., blue) travel along path 222. In this example, it is desired to feed three product Y for every one product B. Pins 208B are connected to rail B (represented by dotted lines) and pins 208F are connected to rail F (represented by dotted lines). When motor 214 rotates in a counter-clockwise direction, pins 208F are positioned out of the associated product path to allow products to pass thereby and pins 208B are positioned in the associated product path to prevent products from passing thereby. In these illustrated pin positions, the first product path 220 is in a feed cycle where three product Y is fed from the metering system 74 while the second product path 222 is in a reload cycle where no product B is fed from the metering system. During the reload cycle, the products B are advanced along second product path 222 up to the pin 208B.

Figure 25:
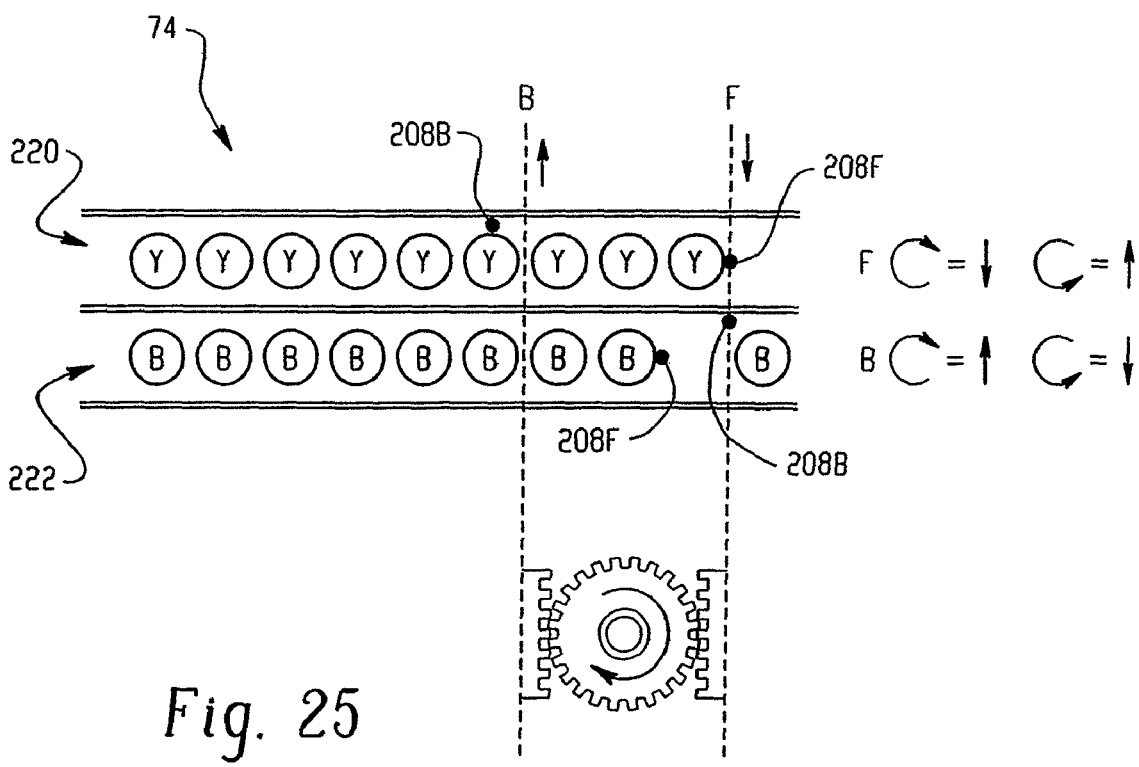

As shown by FIG. 25, when motor 214 rotates in a clockwise direction, pins 208B are positioned out of the associated product path to allow products to pass thereby and pins 208F are positioned in the associated product path to prevent products from passing thereby. In these illustrated pin positions, the second product path 222 is in a feed cycle where one product B is fed from the metering system while the first product path 220 is in a reload cycle where no product Y is fed from the metering system. During the reload cycle, the products Y are advanced along the first product path 220 up to the pin 208F. As can be appreciated, the upstream pins are located a distance from the downstream pins to allow the desired amount of product (e.g., 1 blue and 3 yellow) to fit therebetween. For example, linkages 225 shown most clearly by FIG. 23 allow for placement of the pins 208 at spaced-apart distances. In some embodiments, the pins 208 are moveable along the length of the linkages to change the distances between the upstream pins and the downstream pins and thus the amount of product that can fit therebetween.

Figure 26:
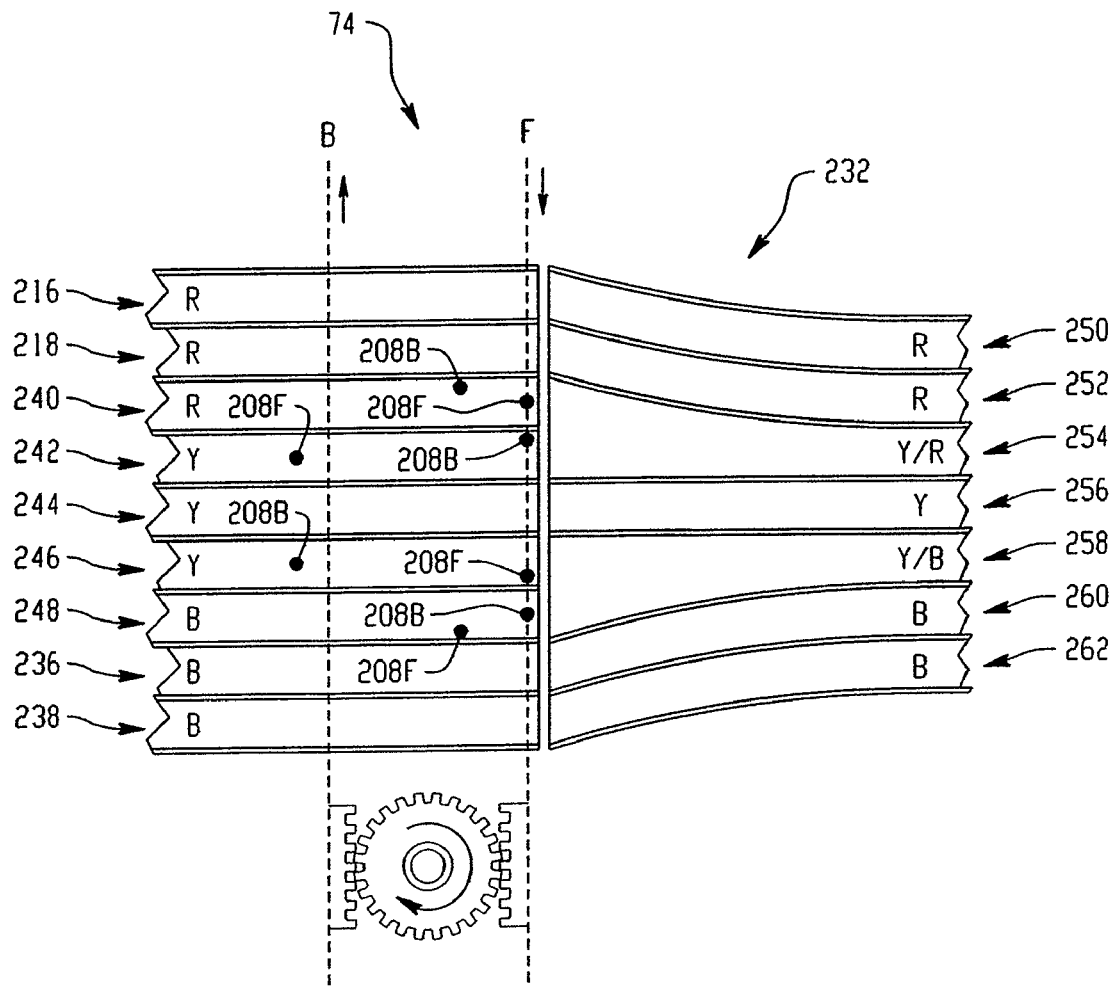
FIG. 26 is a diagrammatic, plan view of the metering system of FIG. 18 along with an embodiment of a product merging system.

Referring now to FIG. 26, the above-described metering process is repeated and products 12 are fed from the metering system 74 to a merging station 232 where products from some adjacent rows leaving the metering system are merged together to create rows of products having different flavors and/or colors. In the illustrated embodiment, the metering system 74 includes nine product columns 216, 218, 240, 242, 244, 246, 248, 236 and 238. Each column 216, 218, 240, 242, 244, 246, 248, 236 and 238 has products 12 of a particular color and/or flavor associated therewith represented by R (e.g., red), Y (e.g., yellow) and B (e.g., blue). End columns 216, 218, 236, 238 and middle column 244 feed directly into respective paths 250, 252, 254, 256 and 258 of the merging station 232 without any merging of products 12. By contrast, columns 240 and 242 merge into path 260 to provide a column of both R and Y products as the products are metered using pins 208F and 208B from the metering system 74 and columns 246 and 248 merge into path 262 to provide a column of both Y and B products as the products are metered using pins 208F and 208B from the metering system. The metering system 74 meters the products so that, once merged in paths 260 and 262, repeating patterns of products are created. In one embodiment, for example, it may be desirable to create repeating patterns of three Y products and one red product along path 260 and three Y products and one B product along path 262.

Figure 27:
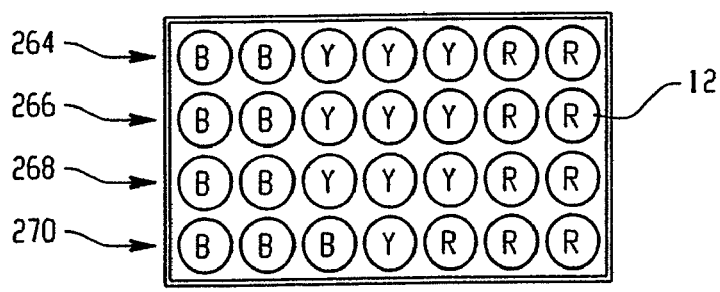
FIG. 27 is a diagrammatic, top view of a restocked product case having an assortment of products.

Each path 250, 252, 254, 256, 258, 260 and 262 feeds product into the repacking stations 86 and 88 (FIG. 5) where the products are accumulated. Once products are accumulated, they are transferred back into trays 64. FIG. 27 illustrates repacked trays of an assortment of products 12 including a predetermined number of B, Y and R products 12. In this example, each row 264, 266, 268, 270 of repacked products includes individual product delivered along each path 250, 252, 254, 256, 258, 260 and 262. Once repacked, the reconstituted product cases are shrink wrapped, stacked into layers onto a pallet and then stretch wrapped as described above.

It is to be clearly understood that the above description is intended by way of illustration and example only and is not intended to be taken by way of limitation, and that changes and modifications are possible. Accordingly, other embodiments are within the scope of the following claims.

What is claimed is:

1. In a packaging system for handling palletized product arranged in multiple layers of product cases, a pallet delayering system comprising:
   a gripper mechanism configured to clamp a layer of the multiple layers by applying a clamping force to one or more product cases of the layer such that the layer can be removed from an adjacent layer of product cases to a different location, the layer including a void between adjacent product cases; and
   a void filling member carried by the gripper mechanism, the void filling member being sized and located to be positioned within the void to limit movement of the adjacent product cases into the void during a clamping operation;

wherein multiple, spaced-apart void filling members are carried by the gripper mechanism, each void filling member moveable by an associated actuator between a raised position and a lowered position relative to the gripper mechanism;
at least one sensor for indicating a void location and a controller for controlling each actuator in response to output of the sensor.

2. The pallet de-layering system of claim 1, wherein the controller raises the void filling member that is not aligned with the void location.

3. The pallet de-layering system of claim 1, wherein the gripper mechanism includes opposing grippers that are arranged and configured to apply opposing gripping forces to product cases of the layer.

4. A method of handling palletized product arranged in multiple product layers of product cases, where a product layer includes multiple cases arranged such that an interior void is located in the product layer, the method comprising:
providing multiple, spaced-apart void filling members carried by a gripper mechanism, each void filling member moveable by an associated actuator between a raised position and a lowered position relative to the gripper mechanism;
utilizing at least one sensor to identify a location of the void in the product layer and responsively lowering the void filling member aligned with the location in order to place the void filling member in the void of the product layer;
expanding the void filling member from a collapsed configuration to occupy a greater volume within the void thereby limiting movement of product cases into the void during a clamping operation; and
applying an inward clamping force against a perimeter of the product layer using the gripper mechanism such that the product layer can be lifted and carried to a different location.

5. The method of claim 4 further comprising detecting a location of a first edge of the product layer.

6. The method of claim 5 further comprising aligning the gripper mechanism with the product layer based at least in part on the location of the first edge.

7. The method of claim 5 further comprising detecting a location of a second edge of the product layer.

8. The method of claim 4 further comprising providing a mechanical interlock arrangement on the void filling member to prevent the void filling member from moving back to the collapsed configuration when the inward clamping force is being applied.

* * * * *